United States Patent
John et al.

(10) Patent No.: US 12,092,233 B2
(45) Date of Patent: Sep. 17, 2024

(54) ELECTRICALLY OPERATED PRESSURE REGULATOR WITH RUPTURE DISC ISOLATION VALVE FOR INFLATION SYSTEM

(71) Applicant: GOODRICH CORPORATION, Charlotte, NC (US)

(72) Inventors: Poly John, Cochin (IN); Vasantha Kumara Jnanegowda, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 116 days.

(21) Appl. No.: 17/871,589

(22) Filed: Jul. 22, 2022

(65) Prior Publication Data
US 2023/0349479 A1 Nov. 2, 2023

(30) Foreign Application Priority Data
Apr. 29, 2022 (IN) .............................. 202241025181

(51) Int. Cl.
*F16K 17/16* (2006.01)
*B64D 25/14* (2006.01)
(Continued)

(52) U.S. Cl.
CPC .............. *F16K 17/16* (2013.01); *B64D 25/14* (2013.01); *F16K 31/0655* (2013.01); *F16K 31/406* (2013.01); *B33Y 80/00* (2014.12)

(58) Field of Classification Search
CPC ................. G05D 16/2093; F16K 17/16; F16K 17/162; F16K 17/168; F16K 17/1606;
(Continued)

(56) References Cited

U.S. PATENT DOCUMENTS 2,819,865 A * 1/1958 Olson ..................... F16K 1/307
251/63.4
4,046,156 A * 9/1977 Cook .................... F16K 17/162
137/68.13
(Continued)

FOREIGN PATENT DOCUMENTS

EP 3597970 1/2020
EP 3835211 6/2021

OTHER PUBLICATIONS

European Patent Office, European Search Report dated Sep. 26, 2023 in Application No. 23169326.8.

*Primary Examiner* — Matthew W Jellett
(74) *Attorney, Agent, or Firm* — SNELL & WILMER L.L.P.

(57) ABSTRACT

A regulator valve assembly may comprise: a housing defining an actuator cavity and a piston head cavity; a piston rod comprising a piston head disposed within the piston head cavity and a rod end disposed within the actuator cavity; and a disc retainer within the housing. The actuator cavity can have a top region of the actuator cavity and a bottom region of the actuator cavity. The piston head cavity can comprise a regulator inlet and an inlet port. The disc retainer can be coupled to a proximate seating surface of the inlet port, wherein a first face of a membrane disc is coupled to a lateral seating surface of the inlet port disposed between the piston head cavity and the disc retainer. Also disclosed are methods of using and manufacturing regulator valve assemblies.

15 Claims, 9 Drawing Sheets

(51) Int. Cl.
*F16K 31/06* (2006.01)
*F16K 31/40* (2006.01)
*B33Y 80/00* (2015.01)

(58) Field of Classification Search
CPC ....... F16K 31/406; F16K 31/42; B64D 25/14; Y10T 137/1692; Y10T 137/1714; Y10T 137/1774; Y10T 137/1789
See application file for complete search history.

(56) References Cited

U.S. PATENT DOCUMENTS

| | | | | |
|---|---|---|---|---|
| 4,520,838 | A * | 6/1985 | Fisher | F17C 13/04 222/3 |
| 4,624,441 | A * | 11/1986 | Kreitchman | F16K 31/406 251/30.01 |
| 4,776,562 | A * | 10/1988 | Kalaskie | F17C 13/04 251/63.4 |
| 6,176,249 | B1 * | 1/2001 | Al-Amin | F16K 13/06 137/68.13 |
| 6,321,770 | B1 * | 11/2001 | Hintzman | F16K 31/56 137/71 |
| 7,032,778 | B2 | 4/2006 | Bock et al. | |
| 7,287,727 | B2 * | 10/2007 | Myers | B64D 25/14 193/25 B |
| 7,490,795 | B2 * | 2/2009 | Clegg | F16K 31/122 244/905 |
| 8,550,104 | B2 * | 10/2013 | Nunez | F16K 17/162 137/71 |
| 11,119,516 | B2 | 9/2021 | Nagaraj et al. | |
| 2018/0216738 | A1 * | 8/2018 | Gabriel | F16K 25/005 |
| 2018/0341279 | A1 * | 11/2018 | John | B64D 25/14 |

* cited by examiner

ELECTRICALLY OPERATED PRESSURE REGULATOR WITH RUPTURE DISC ISOLATION VALVE FOR INFLATION SYSTEM

CROSS-REFERENCE TO RELATED APPLICATIONS

This application claims priority to, and the benefit of, India Provisional Patent Application No. 202241025181, filed Apr. 29, 2022 (DAS Code A83C) and titled "ELECTRICALLY OPERATED PRESSURE REGULATOR WITH RUPTURE DISC ISOLATION VALVE FOR INFLATION SYSTEM," which is incorporated by reference herein in its entirety for all purposes.

FIELD

This disclosure relates generally to inflation systems for aircraft, more specifically, pressure regulators with isolation valves for inflation systems.

BACKGROUND

Aircraft emergency evacuation systems often can include inflatables. These inflatables can be inflated in an event of an emergency using an inflation system. Inflation systems for larger inflatables use an aspirator to draw ambient air to accelerate the inflation process. Aspirator functioning typically includes controlled flow pressures of a gas at the aspirator inlet. A compressed gas tank can be used with such inflation system, along with a pressure regulator and flow isolation valve to isolate the compressed gas tank from the inflatable. The inflation system is actuated by the opening of this isolation valve. Many of aircraft platforms currently employ manual pull cable actuation to operate the isolation valve assembled in a pressure regulator module.

SUMMARY

A regulator valve assembly is disclosed herein. The regulator valve assembly can comprise: a housing defining an actuator cavity and a piston head cavity; a piston rod comprising a piston head disposed within the piston head cavity and a rod end disposed within the actuator cavity; and a disc retainer within the housing. The actuator cavity can have a top region of the actuator cavity and a bottom region of the actuator cavity. The piston head cavity can comprise a regulator inlet and an inlet port. The disc retainer can be coupled to a proximate seating surface of the inlet port, wherein a first face of a membrane disc is coupled to a lateral seating surface of the inlet port disposed between the piston head cavity and the disc retainer.

In various embodiments, the housing can further define a fill port. A fill valve can be coupled to the fill port. In various embodiments, a holder fitting can be disposed within the inlet port and coupled to the disc retainer and a compressed gas tank can be coupled to the housing at the inlet port. In various embodiments, the housing can further define a fill line in fluid communication with the fill valve and the compressed gas tank. The fill valve can be configured to deliver a gas from the fill valve to the compressed gas tank. In various embodiments, the housing can further define a pressure line in fluid communication with the top region of the actuator cavity and the compressed gas tank.

In various embodiments, a piston can be coupled to the piston rod at the rod end and disposed between the top region of the actuator cavity and the bottom region of the actuator cavity. In various embodiments, the housing can further define a solenoid port. A solenoid can be coupled to the solenoid port. In various embodiments, the housing can further define a solenoid line in fluid communication with the solenoid and the compressed gas tank. The compressed gas tank can be configured to deliver the gas to the solenoid. In various embodiments, the housing can define a regulator cavity and a regulator outlet. The regulator cavity can be in fluid communication with the regulator inlet and the regulator outlet. A regulator can be disposed within the regulator cavity.

In various embodiments, the membrane disc can comprise a second face of the membrane disc. In various embodiments, the second face of the membrane disc can be fusion welded to the disc retainer. In various embodiments, the solenoid is configured to energize and deliver the gas to the bottom region of the actuator cavity. The membrane disc can be configured to rupture in response to energizing the solenoid. In various embodiments, a first O-ring can be disposed between the piston and a cap fitting. In various embodiments, a second O-ring can be disposed between the piston and the actuator cavity. In various embodiments, the housing can further define the pressure line in fluid communication with the top region of the actuator cavity and the compressed gas tank. The compressed gas tank can be configured to deliver the gas to the top region of the actuator cavity.

A method of using a regulator valve assembly is disclosed herein. The method of using the regulator valve assembly can comprise: receiving a signal by a solenoid switch; energizing a solenoid coupled to the regulator valve assembly in response to the signal; flowing a gas through the solenoid, wherein the gas creates a pressure force to translate a piston head away from a membrane disc; and rupturing the membrane disc disposed within the regulator valve assembly in response to the piston head translating away from the membrane disc.

In various embodiments, the regulator valve assembly can comprise: a housing defining an actuator cavity and a piston head cavity; a piston rod comprising a piston head disposed within the piston head cavity and a rod end disposed within the actuator cavity; and a disc retainer within the housing. The actuator cavity can have a top region of the actuator cavity and a bottom region of the actuator cavity. The piston head cavity can comprise a regulator inlet and an inlet port. The disc retainer can be coupled to a proximate seating surface of the inlet port, wherein a first face of a membrane disc is coupled to a lateral seating surface of the inlet port disposed between the piston head cavity and the disc retainer.

A method of manufacturing a regulator valve assembly is disclosed herein. The method of manufacturing the regulator valve assembly can comprise: additive manufacturing a housing for the regulator valve assembly, wherein the housing comprises an inlet port, a solenoid port, and a fill port; placing a piston rod inside the housing through the inlet port; coupling a piston to the piston rod; and coupling a valve cap to the housing. In various embodiments, the housing can further define a regulator cavity, a regulator inlet, a regulator outlet, a piston head cavity, and an actuator cavity.

In various embodiments, the method can further comprise: welding a membrane disc to the housing at a lateral seating surface of the inlet port; coupling a disc retainer to the lateral seating surface and a proximal seating surface of the inlet port; and coupling a holder fitting to the housing and the disc retainer.

In various embodiments, the method can further comprise: placing a spring in the regulator cavity; placing a regulator rod in the regulator cavity, wherein the regulator rod and the spring are in contact; and coupling a regulator cap to the housing. In various embodiments, the housing can further define a fill line, a solenoid line, and a pressure line.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of brevity. Any arrows used throughout the figures which do not have numbering are used to show the direction of flow for any fluid in the system.

The systems and methods disclosed herein may find particular use in connection with aircraft inflation systems, including but not limited to aircraft evacuation slides. However, various aspects of the disclosed assemblies and methods may be adapted for performance in a variety of other inflatable assemblies, for example, inflatable raft assemblies, and/or any other assemblies having inflatable structures. As such, numerous applications of the present disclosure may be realized.

Figure 1:
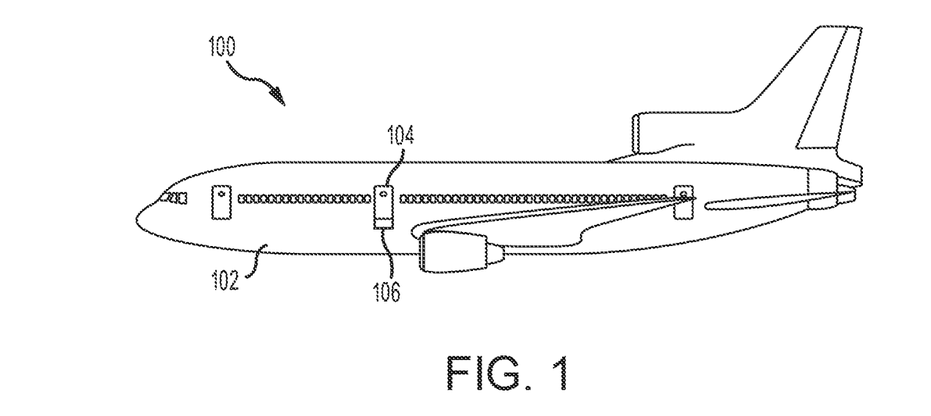
FIG. 1 illustrates an aircraft having an evacuation assembly, in accordance with various embodiments.

Referring now to FIG. 1, an aircraft 100 is shown. Aircraft 100 may include a fuselage 102 having a plurality of exit doors, including an exit door 104. Aircraft 100 may include one or more evacuation systems positioned near a corresponding exit door. For example, aircraft 100 includes an evacuation system 106 positioned near exit door 104. In the event of an emergency, exit door 104 may be opened by a passenger or crew member of aircraft 100. In various embodiments, evacuation system 106 may deploy in response to exit door 104 being opened. It is contemplated and understood that evacuation system 106 may deploy in response to other actions taken by a passenger or crew member such as, for example, depression of a button, actuation of a lever, or the like.

Figure 2:
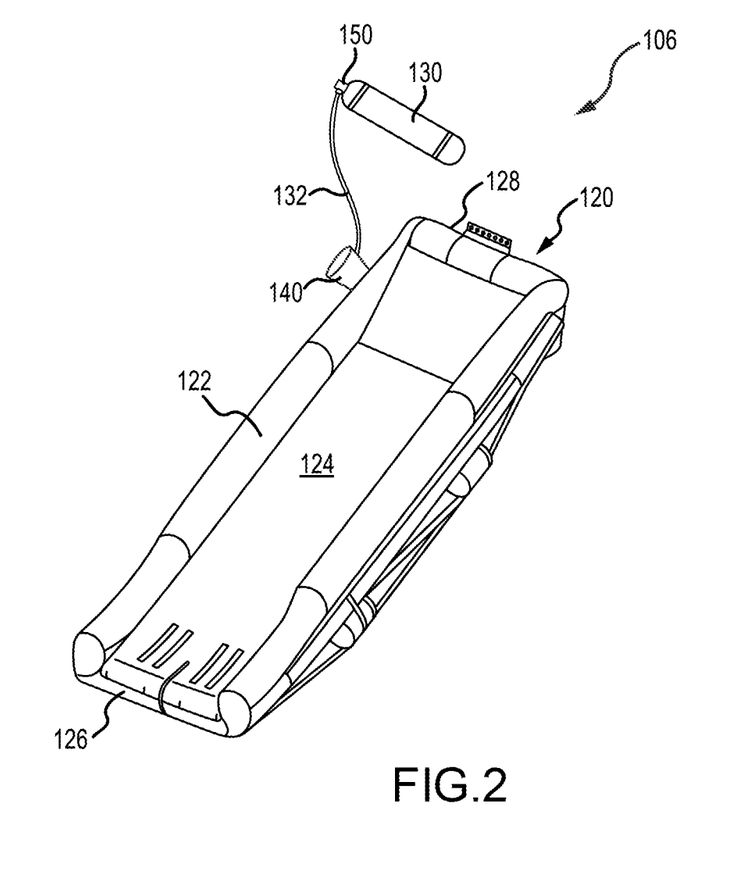
FIG. 2 illustrates an evacuation slide of an evacuation assembly in a deployed position, in accordance with various embodiments.

With reference to FIG. 2, evacuation system 106 is illustrated in a deployed state. In accordance with various embodiments, evacuation system 106 includes an evacuation slide 120 and a compressed gas tank 130 configured to deliver a pressurized gas to inflate evacuation slide 120. In FIG. 2, evacuation slide 120 is in an inflated (i.e., deployed) state. During deployment, an inflatable tube 122 (or a plurality of inflatable tubes) of evacuation slide 120 is inflated using pressurized gas from compressed gas tank 130. Evacuation slide 120 may comprise a sliding surface 124 secured to the inflatable tube 122. Evacuation slide 120 includes a toe end 126 and a head end 128 opposite toe end 126. Head end 128 may be coupled to an aircraft structure (e.g., fuselage 102 in FIG. 1). Sliding surface 124 extends from head end 128 to toe end 126. Evacuation slide 120 is illustrated as a single lane slide. However, evacuation slide 120 may comprise any number of lanes.

Compressed gas tank 130 is fluidly coupled to evacuation slide 120. For example, compressed gas tank 130 may be fluidly coupled to inflatable tube 122 via a hose, or conduit, 132. In various embodiments, the compressed gas tank is coupled to the hose 132 via a regulator valve assembly 150. In various embodiments, evacuation system 106 may include an aspirator 140 fluidly coupled between compressed gas tank 130 and evacuation slide 120. Aspirator 140 is configured to entrain ambient air with gas output from compressed gas tank 130. For example, in response to deployment of evacuation slide 120, the regulator valve assembly 150 can activate and release the gas flow from the compressed gas tank 130 into aspirator 140, which can cause aspirator 140 to draw in ambient air from the environment. The combination of the gas flow from compressed gas tank 130 and the ambient air is then directed into evacuation slide 120, thereby inflating inflatable tube 122.

Figure 3:
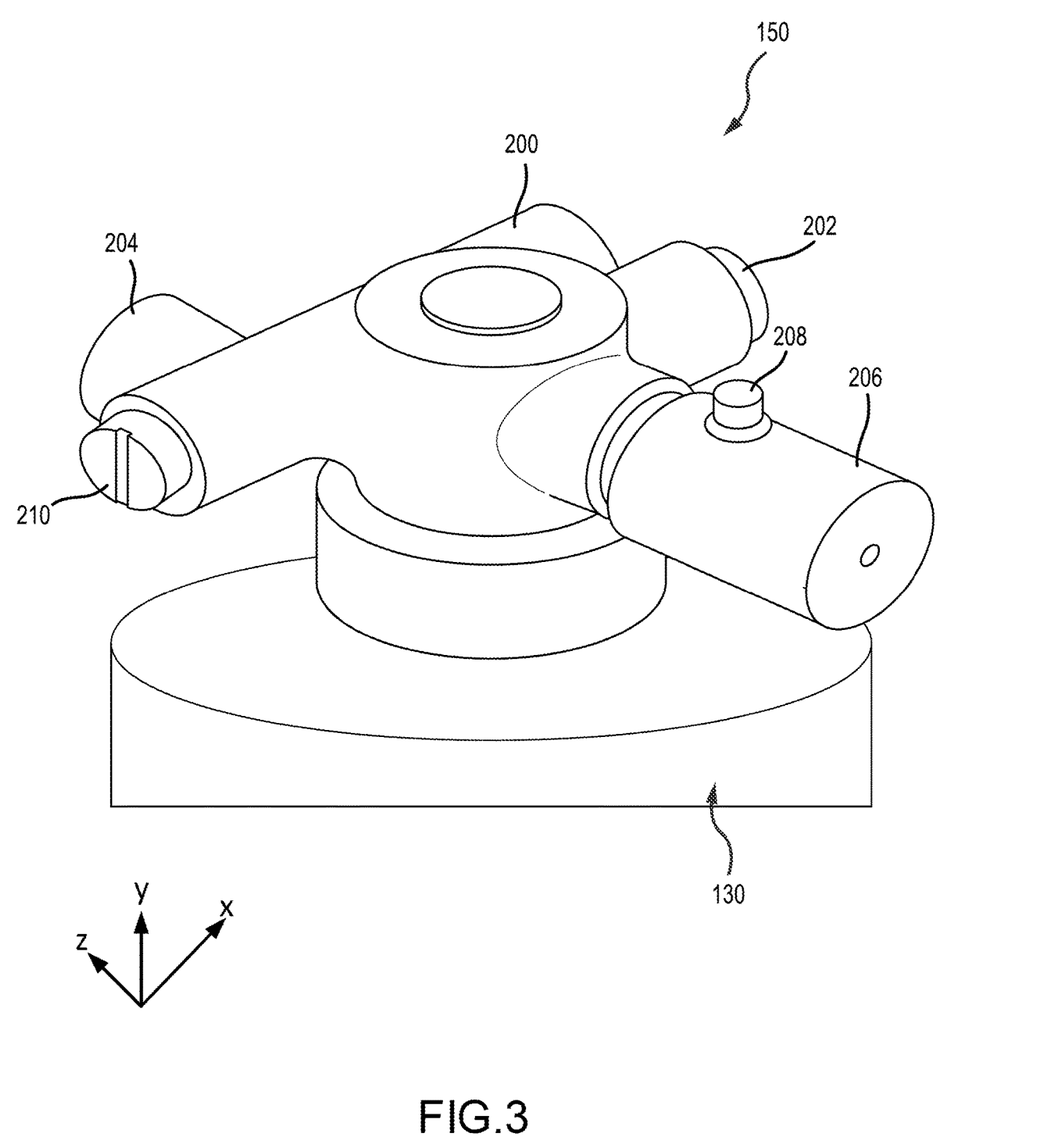
FIG. 3 illustrates an offset view of a regulator valve assembly, in accordance with various embodiments.

In reference to FIG. 3, a regulator valve assembly 150 is shown, in accordance with various embodiments. In various embodiments, the regulator valve assembly 150 comprises a housing 200, a fill valve 202 coupled to the housing 200, a solenoid 206 coupled to the housing 200, a compressed gas tank 130 coupled to the housing 200, and a regulator outlet 204. The solenoid 206 comprises an activation switch 208, which sends an electrical signal to a solenoid valve 375 to energize and open. Energizing the solenoid valve 375 allows the gas to travel through the solenoid 206 and into the actuator cavity 330. The activation switch 208 is configured to receive a signal via electrical communication or a wireless signal, i.e. Radio Frequency (RF) signals, to activate and energize the solenoid 206. In various embodiments, the activation switch 208 is a manual switch which is activated by pressing a mechanical button. The regulator valve assembly can also comprise a regulator cap 210.

Figure 4:
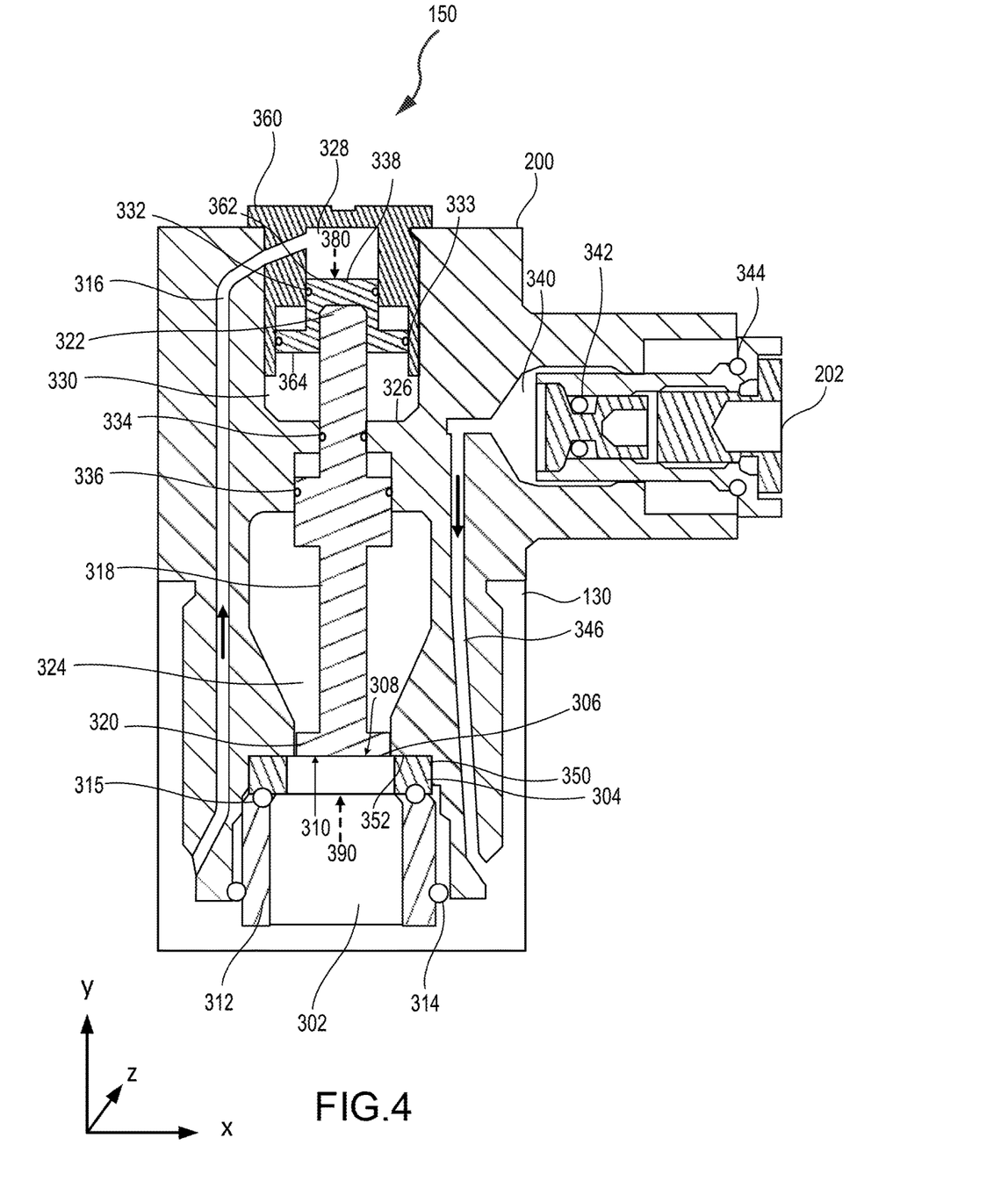
FIG. 4 illustrates a cross section side view of a regulator valve assembly in a de-energized state, in accordance with various embodiments.

In reference to FIG. 4, a cross-section of the regulator valve assembly 150 in a de-energized state is shown, in accordance with various embodiments. The housing 200 of regulator valve assembly 150 defines multiple volumes. The housing 200 defines an inlet port 302 with a lateral seating surface 350 and a proximal seating surface 352. Inlet port 302 is configured to be coupled with a compressed gas tank 130. The inlet port 302 comprises a disc retainer 304 disposed within the inlet port 302 and coupled to the housing 200 at the lateral seating surface 350. In various embodiments, a membrane disc 306 comprises a first face 308 and second face 310. The membrane disc 306 is made of aluminum or similar material which is capable of being ruptured by a pressurized gas. In various embodiments, the membrane disc 306 comprises 1100-0 Aluminum with a thickness between about 0.005 inches (127 micrometers) and about 0.04 inches (1016 micrometers), between about 0.008 inches (203.2 micrometers) and about 0.035 inches (889 micrometers), and between about 0.01 inches (254 micrometers) and about 0.032 inches (812.8 micrometers). The first face 308 of membrane disc 306 can be coupled to the housing 200 at the proximal seating surface 352. In various embodiments, a holder fitting 312 is coupled to the housing 200 and the disc retainer 304. The holder fitting 312 is configured to assist in coupling the compressed gas tank 130 to the regulator valve assembly 150. The second face 310 of the disc membrane 306 is welded to the disc retainer 304 using suitable welding techniques for aluminum welding. In various embodiments, the second face 310 of the disc membrane 306 is fusion welded to the disc retainer 304.

In various embodiments, the housing 200 further defines a fill port 340 and a fill line 346 in fluid communication with the compressed gas tank 130. A fill valve 202 can be coupled at the fill port 340. The fill valve 202 is used to fill the compressed gas tank 130 with a gas. The gas is able to enter the regulator valve assembly 150 via a gas source which is coupled to the fill valve 202. The gas can then go from the fill valve 202, to the fill line 346 and then finally the compressed gas tank 130.

In various embodiments, the housing 200 also defines a piston head cavity 324 and an actuator cavity 326. A piston rod 318 comprises a piston head 320 and a rod end 322. The piston head 320 is disposed within the piston head cavity 324 and the rod end is disposed within the actuator cavity 326. The actuator cavity 326 comprises a top region 328 and a bottom region 330. The bottom is defined as more proximate to the inlet port in the negative y-direction relative to the top. A piston 338 can be disposed in the top region 328 of the actuator cavity 326 and coupled to the rod end 322. The top region 328 of the actuator cavity 326 is defined by a valve cap 360 coupled to the housing 200, and a first face of the piston 362. The bottom region 330 of the actuator cavity 326 is defined by the actuator cavity 326 and a second face of the piston 364. In various embodiments, the housing 200 further defines a pressure line 316 to deliver the gas from the compressed gas tank 130 to the top region 328, therefore the top region 328 and the compressed gas tank 130 is in fluid communication.

In various embodiments, the compressed gas tank 130 is continuously supplying the gas to the top region 328 while the compressed gas tank 130 is coupled to the regulator valve assembly 150. The gas creates a first pressure in the top region 328, which creates a first pressure force 380 which biases the piston 338 towards the piston rod 318. The first pressure force 380 can transfer from the piston rod 318 to the piston head 320 which contacts the first face 308 of the membrane disc 306. The gas from the compressed gas tank 130 can also enter the housing at the inlet port 302 and exert a second pressure force 390 against the second face 310 of the membrane disc 306.

Figure 5:
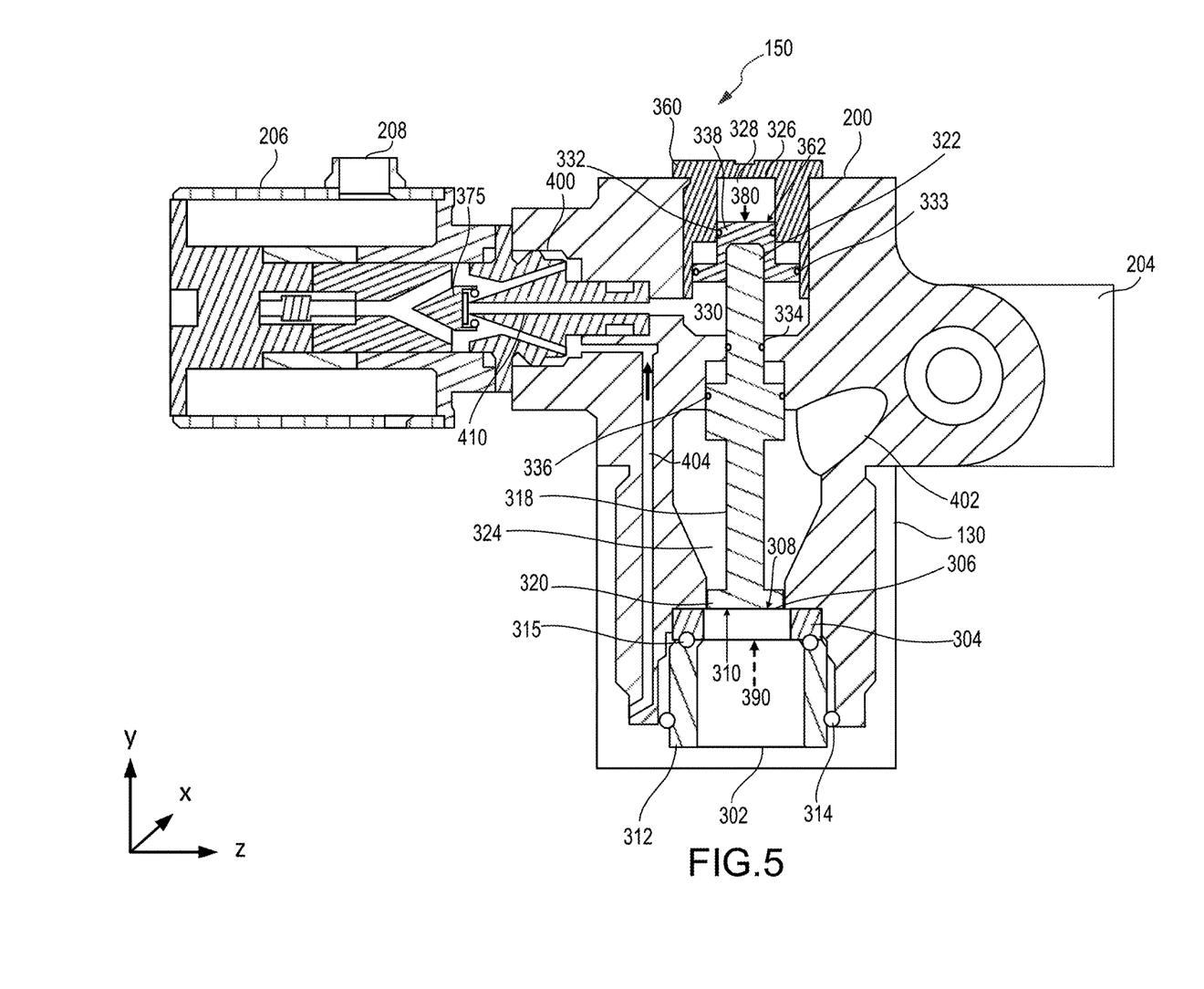
FIG. 5 illustrates a cross section side view of a regulator valve assembly in a de-energized state, in accordance with various embodiments.
Figure 6:
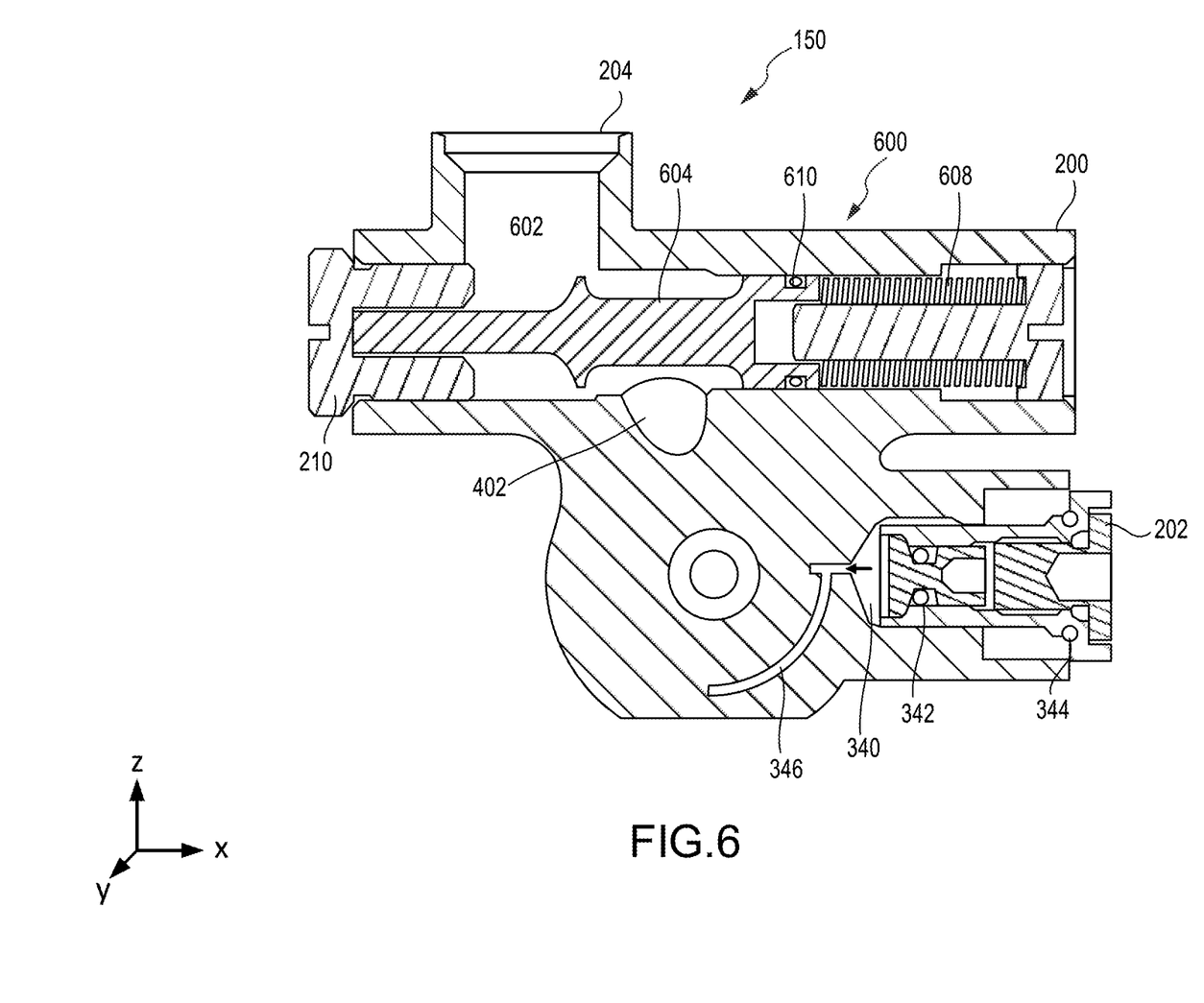
FIG. 6 illustrates a cross section top view of a regulator valve assembly in a de-energized state, in accordance with various embodiments.

With additional reference to FIG. 5 and FIG. 6, cross sections of the regulator valve assembly 150 in a de-energized state are shown, in accordance with various embodiments. The housing 200 also defines a solenoid port 400 configured to have the solenoid 206 coupled to the solenoid port 400. In various embodiments, the housing 200 further defines a solenoid line 404 in fluid communication with the solenoid 206 and the compressed gas tank 130. The gas is supplied from the compressed gas tank 130 to the solenoid 206 through the solenoid line 404. The solenoid can comprise a solenoid outlet line 410 which can deliver the gas from the solenoid 206 to the bottom region 330. When the solenoid 206 is de-energized as illustrated in FIG. 5, the solenoid 206 does not output the gas to the solenoid outlet line 410 into the bottom region 330. In FIG. 4, FIG. 5 and FIG. 6, the solenoid is de-energized. The de-energized state of the regulator valve assembly 150 uses the gas through pressure line 316 to exert the first pressure on the piston 338. The first pressure on piston 338 can translate to the piston rod 318 to force the piston head 320 into contact with the first face 308 of membrane disc 306. The force exerted by the piston head 320 on the membrane disc 306 by the first pressure is configured to equal the force to the membrane disc 306 at the second face 310 by the second pressure such that the membrane does not rupture. In various embodiments, the sum of the first pressure and the second pressure may not be equal, however the sum of the pressures is not sufficient to rupture the membrane disc 306 when the solenoid 206 is de-energized.

In various embodiments, the housing 200 defines a regulator inlet 402 which can fluidly couple the piston head cavity 324 to a regulator cavity 602 defined within the housing 200. A regulator 600 can be disposed between the regulator cavity 602 and the regulator cap 210. The regulator 600 can comprise a regulator rod 604 biased against a spring 608, which exerts a spring force. A regulator O-ring 610 can be disposed between the housing 200 and the regulator rod 604 to create a frictional force. The frictional force and the spring force can help the regulator 600 regulate flow of gas which enters the regulator cavity 602 from the regulator inlet 402. The gas can then exit the regulator valve assembly 150 at the regulator outlet 204 to inflate the evacuation slide 120 or another inflatable device.

In various embodiments, a first fill O-ring 342 and a second fill O-ring 344 are disposed in the fill valve 202 to seal the fill valve 202 to help prevent leakage of the gas from the regulator valve assembly 150. In various embodiments, a first inlet O-ring 315 is disposed between the disc retainer 304 and the holder fitting 312, and a second inlet O-ring 314 is disposed between the housing 200 and the holder fitting 312. The first inlet O-ring 315 and the second inlet O-ring 314 can help seal the inlet port 302 to prevent leakage of the gas.

In various embodiments, the regulator valve assembly 150 comprises a first O-ring 332, a second O-ring 333, a third O-ring 334 and a fourth O-ring 336. The first O-ring 332 is coupled to the piston 338 and disposed between the piston 338 and the valve cap 360 in the top region 328. The second O-ring 333 is coupled to the piston 338 and disposed between the piston 338 and the valve cap 360 in the bottom region 330. The first O-ring 332 and the second O-ring 333 seal the top region 328 from the bottom region 330. The third O-ring 334 is coupled to the piston rod 318 and disposed between the piston rod 318 and the housing 200. The second O-ring 333 and the third O-ring 334 seal the bottom region 330 from the piston head cavity 324. The fourth O-ring 336 is coupled to the piston rod 318 and disposed between the piston rod 318 and the housing 200 in the piston head cavity 324. The third O-ring 334 and the fourth O-ring 336 seal the piston head cavity 324 from the bottom region 330.

Each of the O-rings 332-336 have different sized circumferences. The circumference of an O-ring can change how the O-ring affects the piston rod 318. An O-ring with a larger circumference has more surface area contacting the piston rod 318 and the housing 200. The larger the surface area increases the friction that occurs in response to relative movement of piston rod 318 and the housing 200. Therefore, an O-ring with a larger circumference requires more force to move the O-ring because of the additional surface area contacting the piston rod 318 and the housing 200. In various embodiments, O-ring 336 has a larger circumference than O-ring 333, O-ring 333 has a larger circumference than O-ring 332, and O-ring 332 has a larger circumference than O-ring 334.

Figure 7:
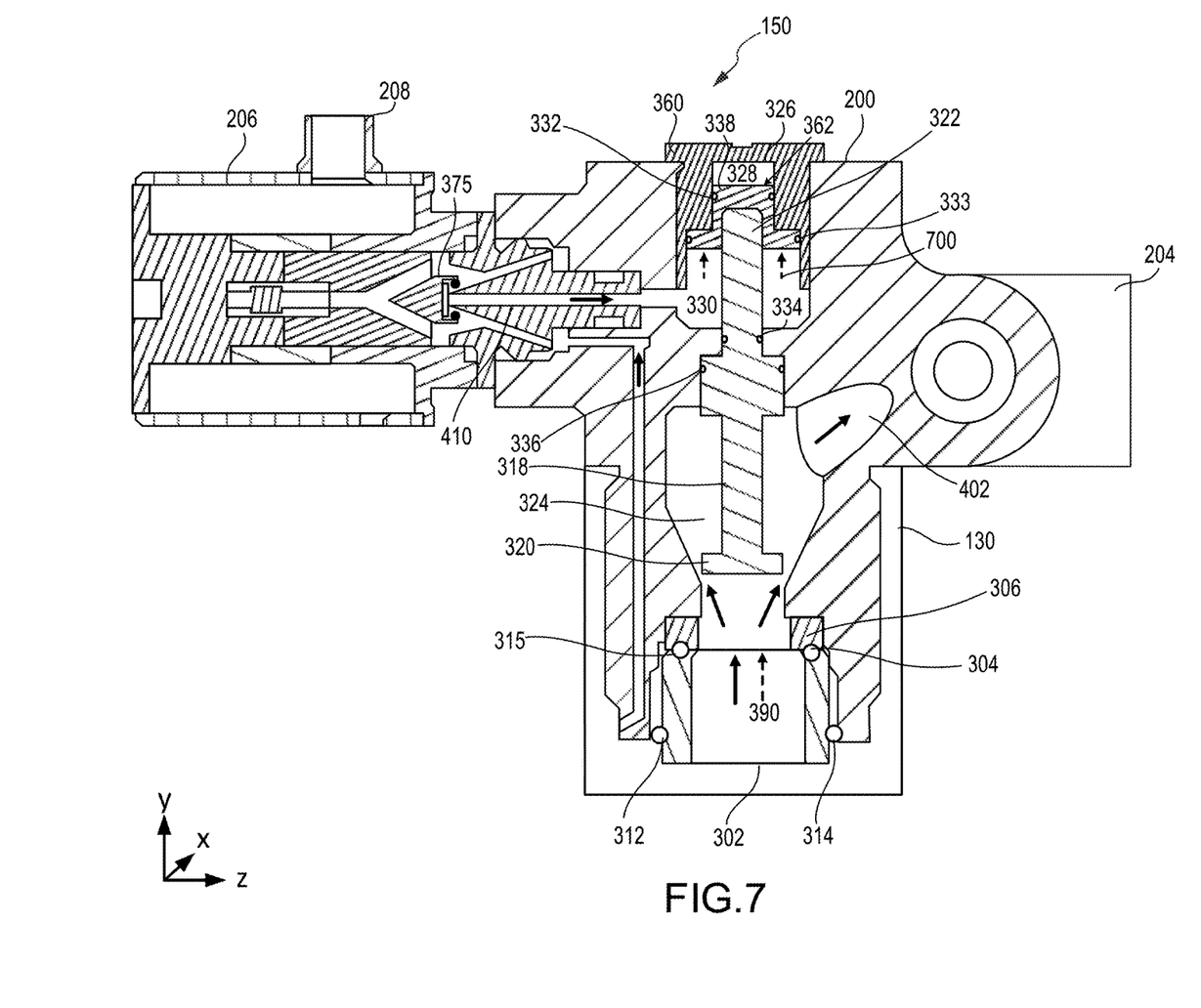
FIG. 7 illustrates a cross section side view of a regulator valve assembly in an energized state, in accordance with various embodiments
Figure 8:
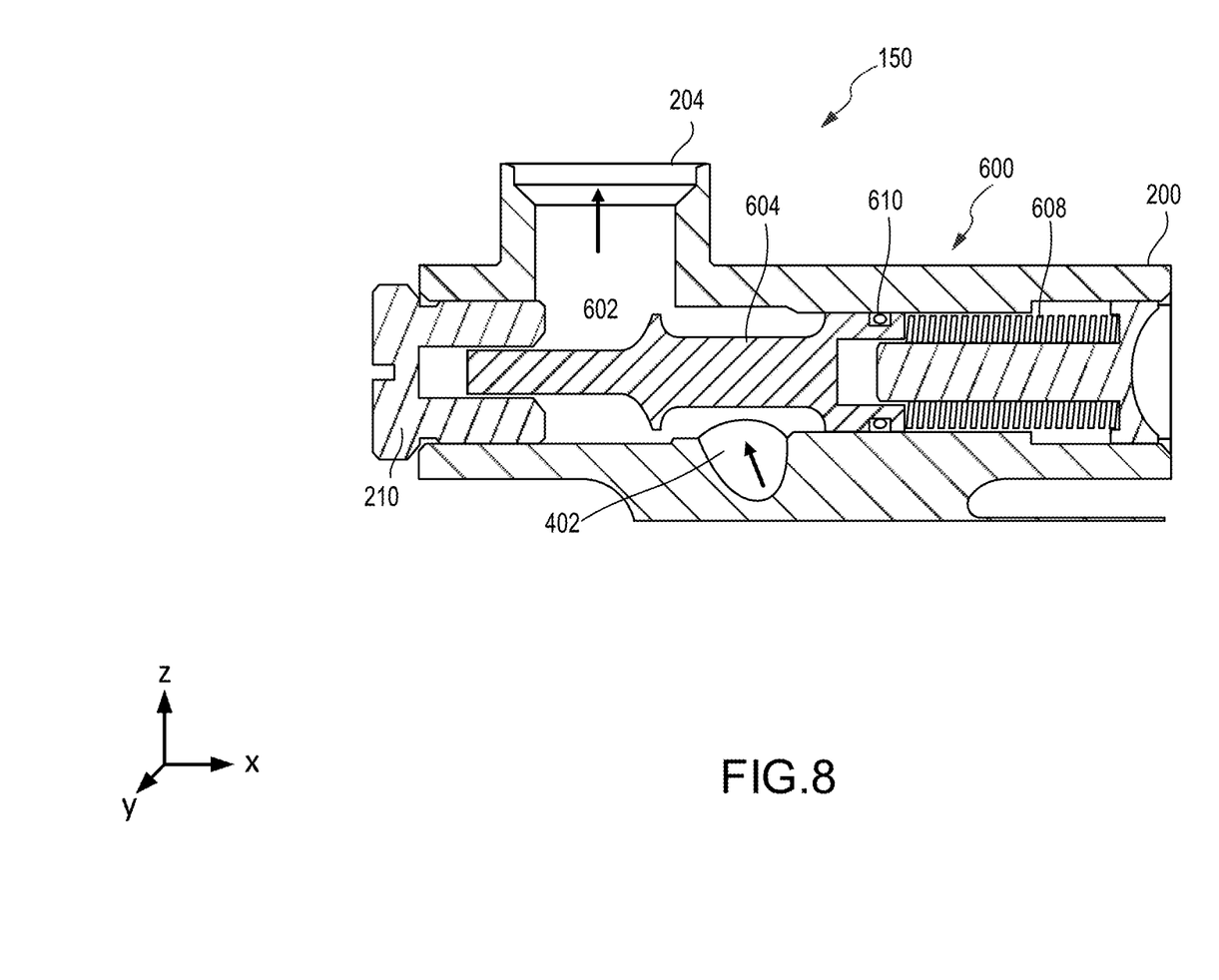
FIG. 8 illustrates a cross section top view of a regulator valve assembly in an energized state, in accordance with various embodiments

In reference to FIG. 7 and FIG. 8, cross sections of the regulator valve assembly 150 in an energized state are shown, in accordance with various embodiments. The regulator valve assembly 150 is in the energized state in response to the solenoid 206 receiving the activation signal from the activation switch 208. In response to the solenoid 206 receiving the activation signal, solenoid 206 energizes, which allows for output of the gas from the solenoid 206 to the bottom region 330 via the solenoid outlet line 410. A third pressure force 700 is then exerted on the piston 338 in the opposite direction of the first pressure force 380.

In various embodiments, the third pressure force 700 is greater than the first pressure force 380. In response to the third pressure force 700 being greater than the first pressure force 380, the third pressure force 700 can translate the piston 338 and the piston rod 318 towards the valve cap 360. Thus, the piston head 320 is no longer contacting the first face 308 of the membrane disc 306. The membrane disc 306 then ruptures due to the second pressure from the inlet port 302 not being opposed by the first pressure from the piston head 320. When the membrane disc 306 ruptures, the gas can enter the piston head cavity 324 and travel to the regulator 600 through the regulator inlet 402. The regulator 600 then regulates the flow of gas from the piston head cavity 324 to the regulator outlet 204 to maintain a desired flow rate and pressure for inflation of the evacuation slide 120 or other inflatable devices. In various embodiments, the membrane disc 306 can be replaced after it's been ruptured. This allows for multiple uses of the regulator valve assembly 150 without having to replace the entire assembly.

In various embodiments, when the membrane disc 306 is ruptured, the solenoid 206 can de-energize and the friction between O-ring 336 and the housing 200 can hold the piston rod 318 in an open position such that the pressurized gas can continue to enter the piston head cavity 324.

Figure 9:
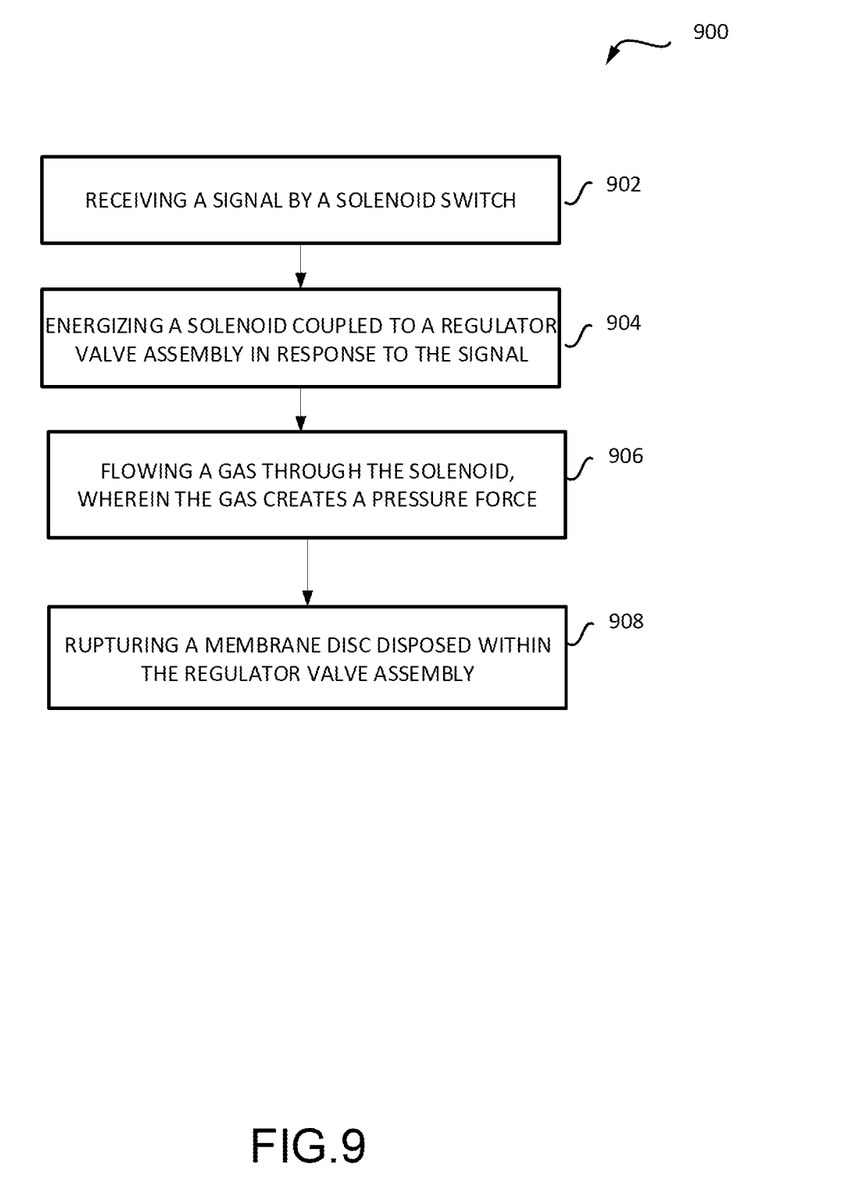
FIG. 9 illustrates a method of using a regulator valve assembly, in accordance with various embodiments.

In reference to FIG. 9, a method of using a regulator valve assembly 900 (shown as regulator valve assembly 150) is shown, in accordance with various embodiments. The method of use 900 includes the steps of receiving a signal by a solenoid switch (shown as solenoid switch 208) (step 902), energizing a solenoid (shown as solenoid 206) coupled to the regulator valve assembly in response to the signal (step 904), flowing a gas through the solenoid, wherein the gas creates a pressure force to translate a piston head (shown as piston head 320) away from a membrane disc (shown as membrane disc 306) (step 906) and rupturing the membrane disc disposed within the regulator valve assembly in response to the piston head translating away from the membrane disc (step 908). In step 908, the membrane disc is ruptured due to the second pressure 390 coming from the gas at the inlet port. The process in step 908 is the same as the process described above when the solenoid is energized.

Figure 10:
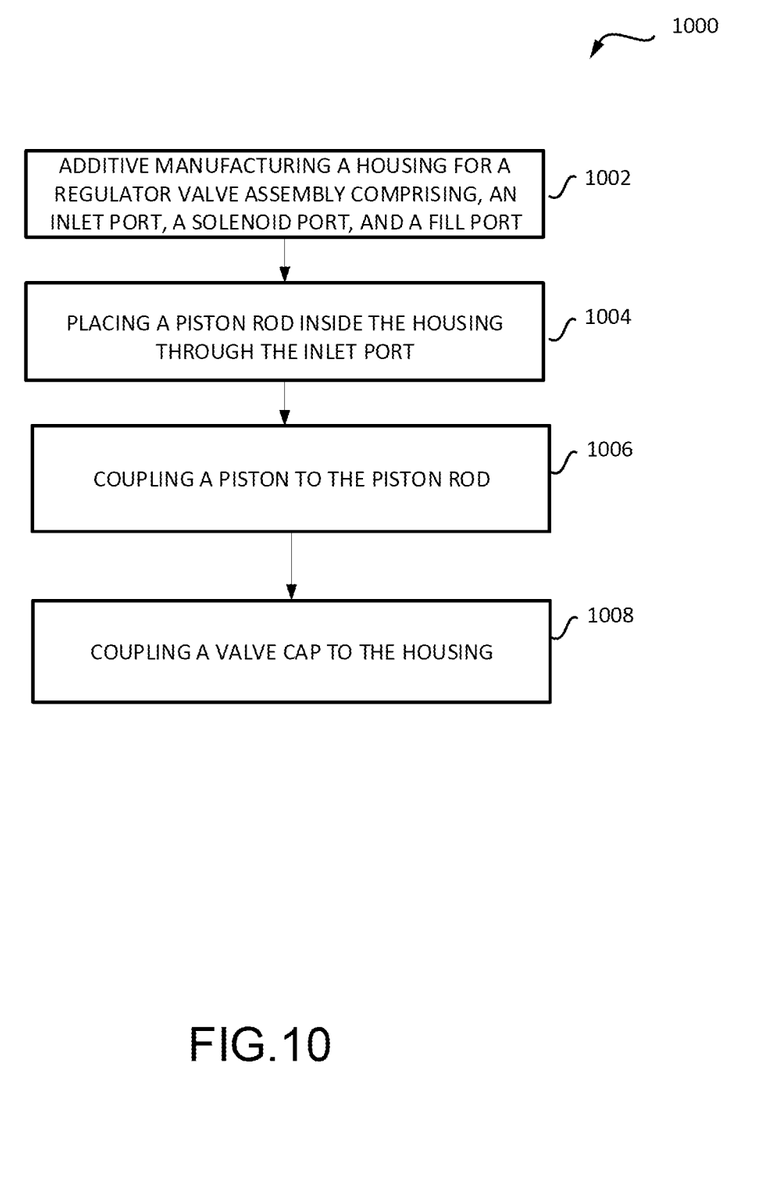
FIG. 10 illustrates a method of manufacturing a regulator valve assembly, in accordance with various embodiments.

In reference to FIG. 10, a method of manufacture 1000 for a regulator valve assembly (shown as regulator valve assembly 150) is shown, in accordance with various embodiments. The method of manufacture 1000 includes the steps of additive manufacturing a housing (shown as housing 200) for the regulator valve assembly, wherein the housing comprises an inlet port (shown as inlet port 302), a solenoid port (shown as solenoid port 400), and a fill port (shown as fill port 340) (step 1002), placing a piston rod (shown as piston rod 318) inside the housing through the inlet port (step 1004), coupling a piston (shown as piston 338) to the piston rod (step 1006) and coupling a valve cap to the housing (shown as valve cap 360) (step 1008). In various embodiments, the housing is manufactured using additive manufacturing methods. Additive manufacturing can significantly reduce the buy-to-fly ratio versus forgings for aircraft parts. The additive manufacturing process can be done using known additive manufacturing processes.

In various embodiments, the housing further defines a regulator cavity (shown as regulator cavity 602), a regulator inlet (shown as regulator inlet 402), a regulator outlet (shown as regulator outlet 204), a piston head cavity (shown as piston head cavity 324) and an actuator cavity (shown as actuator cavity 326).

In various embodiments, the method of manufacture 1000 further comprises, welding a membrane disc to the housing at a lateral seating surface of the inlet port. The membrane disc can be fusion welded, laser welded or any other suitable welding technique for aluminum. In various embodiments, the method of manufacture 1000 further comprises coupling a disc retainer to the lateral seating surface and a proximal seating surface of the inlet port. The disc retainer is coupled to both the lateral seating surface and the membrane disc on the same surface of the disc retainer. In various embodiments, the method of manufacture 1000 further comprises coupling a holder fitting to the housing and the disc retainer.

The holder fitting assists in coupling the compressed gas tank to the regulator valve assembly.

In various embodiments, the method of manufacture 1000 further comprises placing a spring in the regulator cavity, placing a regulator rod in the regulator cavity and coupling a regulator cap to the housing. The regulator rod and the spring can be in contact and the regulator rod, spring and regulator cap can line up parallel to the x-axis. In various embodiments, the housing can be manufactured to define a fill line, a solenoid line and a pressure line which are in fluid communication with a compressed gas tank.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A regulator valve assembly, comprising:
   a housing defining an actuator cavity comprising a top region of the actuator cavity and a bottom region of the actuator cavity, a piston head cavity comprising a regulator inlet, and an inlet port, wherein the housing further defines a solenoid port;
   a solenoid is coupled to the solenoid port;
   a piston rod comprising a piston head disposed within the piston head cavity and a rod end disposed within the actuator cavity; and
   a disc retainer within the housing, coupled to a proximate seating surface of the inlet port, wherein a first face of a membrane disc is coupled to a lateral seating surface of the inlet port disposed between the piston head cavity and the disc retainer, wherein the solenoid is configured to energize and deliver a gas to the bottom region of the actuator cavity, and wherein the membrane disc is configured to rupture in response to energizing the solenoid.

2. The regulator valve assembly of claim 1, wherein the housing further defines a fill port, and a fill valve is coupled to the fill port.

3. The regulator valve assembly of claim 2, wherein a holder fitting is disposed within the inlet port and coupled to the disc retainer, and wherein a compressed gas tank is coupled to the housing at the inlet port.

4. The regulator valve assembly of claim 3, wherein the housing further defines a fill line in fluid communication with the fill valve and the compressed gas tank, and wherein the fill valve is configured to deliver the gas from the fill valve to the compressed gas tank.

5. The regulator valve assembly of claim 4, wherein the housing further defines a pressure line in fluid communication with the top region of the actuator cavity and the compressed gas tank.

6. The regulator valve assembly of claim 5, wherein a piston is coupled to the piston rod at the rod end and is disposed between the top region of the actuator cavity and the bottom region of the actuator cavity.

7. The regulator valve assembly of claim 6, wherein the housing further defines a solenoid line in fluid communication with the solenoid and the compressed gas tank, and wherein the compressed gas tank is configured to deliver the gas to the solenoid.

8. The regulator valve assembly of claim 7, wherein the housing further defines a regulator cavity and a regulator outlet, wherein the regulator cavity is in fluid communication with the regulator inlet and the regulator outlet, and wherein a regulator is disposed within the regulator cavity.

9. The regulator valve assembly of claim 8, wherein the membrane disc comprises a second face of the membrane disc, wherein the second face of the membrane disc is fusion welded to the disc retainer.

10. The regulator valve assembly of claim 8, wherein a first O-ring is disposed between the piston and a cap fitting and a second O-ring is disposed between the piston and the actuator cavity.

11. The regulator valve assembly of claim 10, wherein the housing further defines the pressure line in fluid communication with the top region of the actuator cavity and the compressed gas tank, and wherein the compressed gas tank is configured to deliver the gas to the top region of the actuator cavity.

12. A method of using a regulator valve assembly, the method comprising:
- receiving a signal by a solenoid switch;
- energizing a solenoid coupled to the regulator valve assembly in response to the signal;
- flowing a gas through the solenoid, wherein the gas creates a pressure force to translate a piston head away from a membrane disc; and
- rupturing the membrane disc disposed within the regulator valve assembly in response to the piston head translating away from the membrane disc, wherein the regulator valve assembly comprises:
  - a housing defining an actuator cavity comprising a top region of the actuator cavity and a bottom region of the actuator cavity, and a piston head cavity comprising a regulator inlet;
  - a piston rod comprising the piston head disposed within the piston head cavity and a rod end disposed within the actuator cavity; and
  - a disc retainer within the housing, coupled to a proximate seating surface of an inlet port, wherein a first face of the membrane disc is coupled to a lateral seating surface of the inlet port disposed between the piston head cavity and the disc retainer.

13. A method of manufacturing a regulator valve assembly, comprising:
- additive manufacturing a housing for the regulator valve assembly, wherein the housing comprises an inlet port, a solenoid port, and a fill port, wherein the housing further defines a regulator cavity, a regulator inlet, a regulator outlet, a piston head cavity, and an actuator cavity;
- placing a piston rod inside the housing through the inlet port;
- coupling a piston to the piston rod;
- coupling a valve cap to the housing;
- welding a membrane disc to the housing at a lateral seating surface of the inlet port;
- coupling a disc retainer to the lateral seating surface and a proximal seating surface of the inlet port;
- coupling a holder fitting to the housing and the disc retainer; and
- coupling a solenoid to the solenoid port of the housing, wherein the solenoid is configured to energize and deliver a gas to a bottom region of the actuator cavity, and wherein the membrane disc is configured to rupture in response to energizing the solenoid.

14. The method of manufacture of claim 13, wherein the method further comprises:
- placing a spring in the regulator cavity;
- placing a regulator rod in the regulator cavity, wherein the regulator rod and the spring are in contact; and
- coupling a regulator cap to the housing.

15. The method of manufacture of claim 14, wherein the housing further defines a fill line, a solenoid line and a pressure line.

* * * * *